United States Patent Office 3,078,608
Patented Feb. 26, 1963

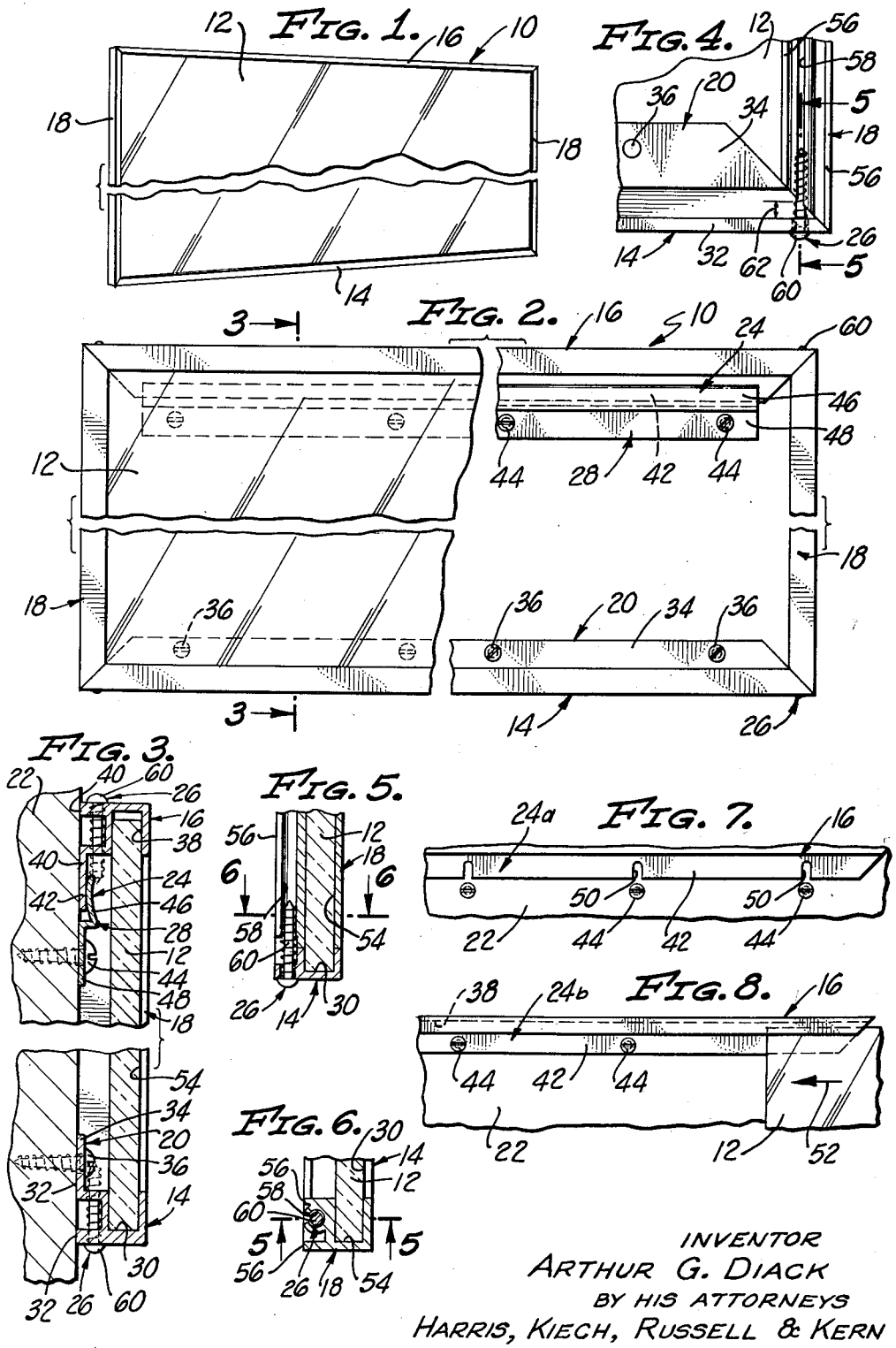

3,078,608
MIRROR FRAME
Arthur G. Diack, 3121 W. 81st St., Inglewood 4, Calif.
Filed Aug. 12, 1960, Ser. No. 49,198
7 Claims. (Cl. 40—152.1)

The present invention relates to frames for mirrors, or the like, and a primary object of the invention resides in the provision of a mirror frame which includes a bottom frame member capable of providing ample support for the weight of a mirror regardless of the width of the mirror, which includes a top frame member capable of providing ample support for the mirror against forward tipping thereof regardless of the width of the mirror, which encloses all edges of the mirror and at a cost no higher than the cost of finishing the edges of the mirror so that the mirror edges may be left unfinished, which includes concealed means for securing the bottom and top frame members to a supporting structure, which includes concealed means for securing side frame members to the bottom and top frame members, which includes means for securing the side frame members directly to the bottom and top frame members in such a manner that no auxiliary fittings at the corners of the frame are required, which includes inwardly-facing bottom, top and side channels in the bottom, top and side frame members for receiving the bottom, top and side edges of the mirror to hold the mirror securely in place, which has mitered corners to provide a finished frontal appearance, and the frame members of which may readily be cut to any desired lengths on the job to fit mirrors of any dimensions.

More particularly, an important object of the invention is to provide a mirror frame including bottom, top and side frame members respectively having front and rear surfaces wherein the channels in the frame members are located adjacent the front surfaces thereof, and wherein the means for mounting the bottom and top frame members on the supporting structure and the means for connecting the side frame members to the bottom and top frame members are located rearwardly of the channels in the frame members and adjacent the rear surfaces of the frame members.

Another important object is to provide bottom mounting means for the bottom frame member and top mounting means for the top frame member which are located behind and concealed by the mirror, the bottom mounting means including an upwardly extending, bottom mounting flange on the bottom frame member adjacent the rear surface thereof and above and rearwardly of the channel in the bottom frame member, and the top mounting means including a downwardly extending, top mounting flange on the top frame member adjacent the rear surface of the top frame member and located below and rearwardly of the channel in the top frame member.

Still another important object of the invention is to provide frame-member interconnecting means located rearwardly of the channels in the frame members for securing the side frame members directly to the bottom and top frame members in a concealed manner, the frame-member interconnecting means comprising vertical screws extending through the respective ends of the top and bottom frame members and threaded into the respective ends of vertical screw troughs in the side frame members to secure the side frame members to the bottom and top frame members. With this construction, the screws for securing the side frame members to the bottom and top frame members are visible only from above and below the mirror frame, and thus, for practical purposes, are invisible to anyone viewing the mirror from a normal position in front thereof, which is an important feature of the invention.

The foregoing objects, advantages, features and results of the invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawing, wherein:

FIG. 1 is a front perspective view of a mirror mounted in a mirror frame which embodies the invention;

FIG. 2 is an enlarged, front elevational view of the mirror mounted in the mirror frame of the invention, a portion of the mirror being broken away to reveal details of the mirror fame;

FIG. 3 is an enlarged, vertical sectional view taken along the arrowed line 3—3 of FIG. 2 and showing the mirror frame of the invention secured to a supporting structure;

FIG. 4 is an enlarged, rear elevational view of one corner of the mirror frame of the invention;

FIG. 5 is a fragmentary vertical sectional view taken along the arrowed line 5—5 of FIG. 4, and also as indicated by the arrowed line 5—5 of FIG. 6;

FIG. 6 is a fragmentary horizontal sectional view taken along the arrowed line 6—6 of FIG. 5; and FIGS. 7 and 8 are fragmentary front elevational views respectively similar to the upper portions of FIG. 2 and respectively disclosing alternative embodiments of the invention.

Referring to the drawing, the numeral 10 designates a rectangular frame of the invention in which is set a rectangular mirror 12. The frame 10 completely encloses the edges of the mirror 12 so that such edges may be left raw and unfinished, thereby saving the considerable expense of grinding and polishing the mirror edges.

Basically, the frame 10 includes a bottom frame member 14 which encloses the bottom edge of the mirror 12 and which supports the weight of the mirror, a top frame member 16 which encloses the top edge of the mirror and which prevents tipping of the mirror about its bottom edge, side frame members 18 which enclose the respective side edges of the mirror and which have mitered ends respectively abutting mitered ends of the bottom and top frame members to provide the frame 10 with mitered corners, concealed bottom mounting means 20 for securing the bottom frame member to a supporting structure 22, FIG. 3, concealed top mounting means for securing the top frame member 16 to the supporting structure, and concealed frame-member interconnecting means 26 for directly connecting the side frame members to the bottom and top frame members.

As will become apparent, the bottom and top frame members 14 and 16 are identical in cross section, as are the side frame members 18. These frame members are preferably aluminum extrusions, although they may be formed of other materials, which are produced in stock lengths and which may readily be cut to the necessary lengths for the particular mirror 12 on the job. Except for a top mounting member 28 which, in the preferred embodiment of the invention, forms part of the top mounting means 24 and which is also preferably an aluminum extrusion produced in stock lengths, the remaining components of the frame 10 consist entirely of screws. Thus, all of the components of the mirror frame 10 are either inexpensively producible, or are inexpensive, commercially available components, wherefore the mirror frame 10 may be fabricated quite inexpensively. As previously pointed out, the cost of the mirror frame 10 of the invention is of the same order of magnitude as the cost of grinding and polishing the edges of the mirror 12, wherefore the present invention has the effect of providing a mirror frame 10 which has the advantages of completely enclosing the edges of the mirror 12 at substantially no cost since the edges of the mirror may be left unfinished, which is an important feature.

Considering the mirror frame 10 now in more detail, the bottom frame member 14 is provided adjacent its front surface with a horizontal channel 30 which faces inwardly relative to the frame 10, i.e., which faces upwardly, and which receives the bottom edge of the mirror 12 therein. The bottom frame member 14 is provided with a rear surface 32 along its lower edge which is adapted to abut the supporting structure 22 and which is maintained in abutting relation with the supporting structure by the weight of the mirror 12, as will be apparent from FIG. 3 of the drawing.

The bottom mounting means 20 for the bottom frame member 14 includes a rearwardly offset, upwardly extending, horizontal, bottom mounting flange 34 on the bottom frame member 14 and located above and rearwardly of the channel 30 in the bottom frame member, the rear surface of the bottom mounting flange 34 being flush with and forming part of the rear surface 32 of the bottom frame member and being abuttable against the supporting structure 22. The bottom mounting means 20 includes bottom mounting screws 36 extending through the bottom mounting flange 34 rearwardly of and above the channel 30 in the bottom frame member 14 and threaded into the supporting structure 22. It will be understood that as many of the bottom mounting screws 36 are used as are required to provide ample support for the weight of the mirror 12, there being no limit to the width of the mirror since it is merely necessary to correspondingly increase the length of the bottom frame member and to increase correspondingly the number of bottom mounting screws 36, which is an important feature of the invention.

Offsetting the bottom mounting flange 34 upwardly relative to the channel 30 in the bottom frame member 14 has the important advantage of concealing the bottom mounting flange, and the bottom mounting screws 36, behind the lower edge of the mirror 12. An important advantage of rearwardly offsetting the bottom mounting flange 34 relative to the channel 30 in the bottom frame member 14 is that it provides between the bottom mounting flange and the mirror 12 a space to receive the heads of the bottom mounting screws 36. Thus, round head screws may be used, thereby avoiding the expense associated with the use of countersunk screws, which is an important feature.

The top frame member 16, as previously pointed out, is identical to the bottom frame member 14 in cross section, the only difference between the bottom and top frame members being that the top frame member is inverted relative to the bottom frame member. Thus, the top frame member 16 is provided adjacent its front surface with a horizontal channel 38 which faces downwardly toward the center of the frame 10 and which receives the top edge of the mirror 12 therein. The top frame member 16 includes a rear surface 40 abuttable against the supporting structure 22 and includes a top mounting flange 42 the rear surface of which is flush with and forms part of the rear surface 40 and is also abuttable against the supporting structure. The top mounting flange 42 on the top frame member 16 extends downwardly and is offset below the channel 38 so as to conceal the top mounting means 24 behind the top edge of the mirror 12. The rearward offset of the top mounting flange 42 relative to the channel 38 also provides a space rearwardly of the mirror 21 which permits the use of round head top mounting screws 44, which will be described hereinafter, thereby avoiding the expense associated with the use of countersunk top mounting screws, which is an important feature.

The top frame member 16 is secured to the supporting structure 22 by the top mounting member 28 and the top mounting screws 44. The top mounting member 28 is essentially Z-shaped in cross section and includes a forwardly offset, horizontal upper flange 46 which is engageable with the front surface of the top mounting flange 42 to clamp it against the supporting structure 22. The top mounting member 28 further includes a rearwardly offset, horizontal lower flange 48 which is adapted to be secured to the supporting structure 22 by the hereinbefore-discussed top mounting screws 44. It will be understood that as many of the top mounting screws 44 may be utilized as are required to prevent tipping of the mirror 12, wherefore the mirror may be of unlimited horizontal width, which is an important feature. It will be further understood that instead of utilizing a continuous top mounting member 28 as shown, a series of horizontally spaced, top mounting clips, not shown, each having the cross section of the top mounting member 28, may be utilized.

It will be apparent that in mounting the mirror frame 10 on the supporting structure 22, the first step is to secure the bottom frame member 14 and the top mounting member 28 to the supporting structure by means of the bottom mounting screws 36 and the top mounting screws 44, respectively, with a vertical spacing between the bottom frame member and the top mounting member dependent on the vertical height of the mirror 12. Thereafter, the lower edge of the mirror 12 is placed in the channel 30 in the bottom frame member 14 and the top frame member 16 is then placed in position, the top mounting flange 42 on the top frame member 16 being inserted behind the upper flange 46 of the top mounting member 28 at the same time as the top edge of the mirror is inserted into the channel 38 in the top frame member 16. The final step in assembling the frame 10 is to secure the side frame members 18 to the bottom and top frame members 14 and 16 through the use of the frame-member interconnecting means 26, as will be described hereinafter.

Referring to FIG. 7 of the drawing, illustrated therein is an alternative top mounting means 24a which merely involves providing the lower edge of the top mounting flange 42 of the top frame member 16 with vertical notches 50 adapted to receive therein the shanks of the top mounting screws 44 when the top mounting flange 42 is inserted between the supporting structure 22 and the heads of the top mounting screws 44. When utilizing the alternative top mounting means 24a, the top mounting member 28 is omitted and the top mounting screws 44 are driven into the supporting structure 22 a distance such that the top mounting flange 42 can be inserted between the supporting structure 22 and the heads of the top mounting screws, these screws being located at a level such that the channel 38 in the top frame member encloses the top edge of the mirror 12 when the top mounting flange 42 is inserted between the heads of the top mounting screws 44 and the supporting structure 22. With this construction, the bottom frame member 14 and the top mounting screws 44 are installed first. Then, the lower edge of the mirror 12 is placed in the channel 30 in the bottom frame member 14 and the top frame member 16 is then slipped over the top edge of the mirror and behind the top mounting screws 14 simultaneously. This installation is a little less expensive than the one illustrated in FIGS. 1 to 6 of the drawing in that it omits the top mounting member 28. However, a little more effort is involved in making the installation.

In FIG. 8 of the drawing is shown another alternative top mounting means 24b wherein the top mounting member 28 is again omitted and wherein the top mounting screws 44 extend directly through the top mounting flange 42 of the top frame member 16. In this case, the bottom and top frame members 14 and 16 are mounted on the supporting structure 22 with the proper vertical spacing therebetween, and the bottom and top edges of the mirror 12 are then inserted in the respective channels 30 and 38 in the bottom and top frame members by sliding the mirror horizontally into place from one side or the other, as indicated by the arrow 52 in FIG. 8. As will be apparent, this installation can be made only where there is enough clearance on one side or the other to permit lateral insertion of the bottom and top edges of the mirror 12 into the respective channels 30 and 38 in the bottom and top frame members 14 and 16.

The side frame members 18 and the frame-member interconnecting means 26 for connecting the side frame members to the bottom and top frame members 14 and 16 will now be considered, the following description being applicable irrespective of which of the top mounting means 24, 24a and 24b is utilized.

Referring to FIGS. 4 to 6 of the drawing, and particularly to FIG. 6 thereof, each side frame member 18 is provided adjacent its front surface with a vertical channel 54 which receives therein the corresponding vertical edge of the mirror 12. Each side frame member 18 includes an interrupted rear surface 56 abuttable against the supporting structure 22 when the frame 10 is mounted thereon. It will be noted from FIG. 6 of the drawing that the side frame members 18 are very similar in cross section to the bottom and top frame members 14 and 16, one difference being that the side frame members are not provided with any flanges corresponding to the bottom and top mounting flanges 34 and 42 of the bottom and top frame members. Another difference between the side frame members 18 and the bottom and top frame members 14 and 16 is that the side frame members are provided therein adjacent the rear surfaces 56 thereof and rearwardly of the channels 54 therein with vertical screw troughs 58 open on their rearward sides. The frame-member interconnecting means 26 includes four vertical screws 60 respectively extending vertically through the ends of the bottom and top frame members 14 and 16 and threaded into the respective ends of the screw troughs 58.

With the foregoing construction, after the bottom and top frame members 14 and 16 have been mounted on the supporting structure 22, utilizing one of the top mounting means 24, 24a and 24b, and after the mirror 12 has been mounted in the channels 30 and 38 in the bottom and top frame members, the side frame members 18 are placed in their proper positions by sliding them horizontally over the corresponding side or vertical edges of the mirror 12 so that the side edges of the mirror are received in the respective channels 54 in the side frame members. At the same time, the portions of the side frame members 18 which carry the screw troughs 58 are inserted behind the vertical edges of the mirror 12 and between the mirror and the supporting structure 22. The vertical screws 60 are then inserted upwardly through the ends of the bottom frame member 14 and downwardly through the ends of the top frame member 16 and are respectively threaded into the corresponding ends of the screw troughs 58 to secure the side frame members to the bottom and top frame members, thereby completing the frame 10.

An important feature of the invention is that the side frame members 18 are connected to the bottom and top frame members 14 and 16 solely by the vertical screws 60, there being no horizontal screws extending through the side frame members into the bottom and top frame members. Thus, from the point of view of an observer standing in a normal position in front of the mirror 12, the screws 60 are completely invisible since those connecting the side frame members 18 to the bottom frame member 14 are below eye level and those connecting the side frame members to the top frame member 16 are above eye level. For all practical purposes, the screws 60 are completely invisible even though round head screws are used as shown. Greater concealment of the screws 60 can be achieved by countersinking them into the ends of the bottom and top frame members 14 and 16 if desired, but this is actually an unnecessary added expense.

It will be understood that the screws 60 serve merely to connect the side frame members 18 to the bottom and top frame members 14 and 16 to hold the side frame members in place and that the screws 60 carry no load insofar as the weight of the mirror 12 is concerned. As previously explained, the entire weight of the mirror is carried by the bottom frame member 14 and as many of the bottom mounting screws 36 may be utilized as are necessary to carry the weight of a particular mirror. The top frame member 16, of course, merely prevents tipping of the mirror 12 about its bottom edge.

It will be noted that although the rear surfaces 32 and 40 of the bottom and top frame members 14 and 16 are interrupted, by being horizontally grooved, to reduce the amount of aluminum, or other material, required for their fabrication, the use of mitered joints at the corners of the frame 10 nevertheless results in very short unsupported lengths for the vertical screws 60, such unsupported length being designated by the dimensional arrow 62 in FIG. 4 of the drawing. Thus, the present invention, through the use of mitered joints at the corners of the frame 10, permits minimizing the amount of material in the bottom and top frame members 14 and 16 without requiring excessive unsupported lengths 62 for the screws 60 which connect the side frame members 18 to the bottom and top frame members.

Another important feature of the present invention results from the fact that the weight of the mirror 12, when the frame 10 is mounted on the supporting structure 22, produces a torque which tends to close the front edges of the mitered joints between the side frame members 18 and the bottom and top frame members 14 and 16 even though the screws 60 for connecting the side frame members to the bottom and top frame members are located behind the mirror 12 and adjacent the rear surfaces of the frame members, the direction of this torque being clockwise as viewed in FIG. 3. Thus, the present invention permits rearward locations behind the mirror 12 for the screws 60 without any tendency to open the front edges of the mitered joints at the corners of the frame 10 when the frame is mounted on the supporting structure 22.

Although exemplary embodiments of the present invention have been disclosed herein for purposes of illustration, it will be understood that various changes, modifications and substitutions may be incorporated in such embodiments without departing from the spirit of the invention as defined by the following claims.

I claim:

1. In combination: a rectangular frame including bottom, top and side frame members respectively provided with channels which face inwardly of said frame and which are respectively adapted to receive therein the edges of a rectangular mirror, or the like; bottom mounting means located above and rearwardly of said channel in said bottom frame member for securing said bottom frame member to a supporting structure; top mounting means located below and rearwardly of said channel in said top frame member for securing said top frame member to the supporting structure; and frame-member interconnecting means for securing said side frame members directly to said bottom and top frame members, comprising vertical screws extending through said top and bottom frame members and threaded into said side frame members, said screws being located rearwardly of said channels in said frame members and being located laterally inwardly of the laterally outermost parts of said channels in said side frame members.

2. In combination: a rectangular frame including bottom, top and side frame members respectively having front and rear surfaces and respectively provided adjacent said front surfaces thereof with channels which face inwardly of said frame and which are respectively adapted to receive therein the edges of a rectangular mirror, or the like; bottom mounting means located above and rearwardly of said channel in said bottom frame member, and including an upwardly extending, bottom mounting element on said bottom frame member above and rearwardly of said channel therein, for securing said bottom frame member to a supporting structure; top mounting means located below and rearwardly of said channel in said top frame member, and including a depending top mounting element on said top frame member below and rearwardly of said channel therein, for securing said top frame member to the supporting structure; and frame-member interconnecting means for securing said side frame members to said bottom and top frame members.

3. In combination: a rectangular frame provided with mitered corners and including bottom, top and side frame members respectively having front and rear surfaces and respectively provided adjacent said front surfaces thereof with channels which face inwardly of said frame and which are respectively adapted to receive therein the edges of a rectangular mirror, or the like; bottom mounting means located above and rearwardly of said channel in said bottom frame member, and including an upwardly extending, bottom mounting element on said bottom frame member above and rearwardly of said channel therein, for securing said bottom frame member to a supporting structure; top mounting means located below and rearwardly of said channel in said top frame member, and including a depending top mounting element on said top frame member below and rearwardly of said channel therein, for securing said top frame member to the supporting structure; and vertical screws located rearwardly of said channels in said frame members and respectively extending through the ends of said top and bottom frame members and respectively threaded into the ends of said side frame members to secure said side frame members directly to said bottom and top frame members, said screws being located laterally inwardly of the laterally outermost parts of said channels in said side frame members.

4. In combination: a rectangular frame provided with mitered corners and including bottom, top and side frame members respectively having front and rear surfaces and respectively provided adjacent said front surfaces thereof with channels which face inwardly of said frame and which are respectively adapted to receive therein the edges of a rectangular mirror, or the like; bottom mounting means located above and rearwardly of said channel in said bottom frame member, and including an upwardly extending, bottom mounting element on said bottom frame member above and rearwardly of said channel therein, for securing said bottom frame member to a supporting structure; top mounting means located below and rearwardly of said channel in said top frame member, and including a depending top mounting element on said top frame member below and rearwardly of said channel therein, for securing said top frame member to the supporting structure; and vertical screws located rearwardly of said channels in said frame members and respectively extending through the ends of said top and bottom frame members and respectively threaded into the ends of said side frame members to secure said side frame members directly to said bottom and top frame members, said side frame members respectively being provided therein with vertical screw troughs into the ends of which said screws are respectively threaded, said screw troughs being located laterally inwardly of the laterally outermost parts of said channels in said side frame members.

5. In combination: a rectangular frame provided with mitered corners and including bottom, top and side frame members respectively having front and rear surfaces and respectively provided adjacent said front surfaces thereof with channels which face inwardly of said frame and which are respectively adapted to receive therein the edges of a rectangular mirror, or the like; bottom mounting means located above and rearwardly of said channel in said bottom frame member for securing said bottom frame member to a supporting structure, said bottom mounting means including an upwardly extending, bottom mounting flange on said bottom frame member adjacent said rear surface of said bottom frame member and above and rearwardly of said channel in said bottom frame member; top mounting means located below and rearwardly of said channel in said top frame member for securing said top frame member to the supporting structure, said top mounting means including a downwardly extending, top mounting flange on said top frame member adjacent said rear surface of said top frame member and below and rearwardly of said channel in said top frame member; and vertical screws located rearwardly of said channels in said frame members and respectively extending through the ends of said top and bottom frame members and respectively threaded into the ends of said side frame members to secure said side frame members directly to said bottom and top frame members, said screws being located laterally inwardly of the laterally outermost parts of said channels in said side frame members.

6. In combination: a rectangular frame provided with mitered corners and including bottom, top and side frame members respectively having front and rear surfaces and respectively provided adjacent said front surfaces thereof with channels which face inwardly of said frame and which are respectively adapted to receive therein the edges of a rectangular mirror, or the like; bottom mounting means located above and rearwardly of said channel in said bottom frame member for securing said bottom frame member to a supporting structure, said bottom mounting means including an upwardly extending, bottom mounting flange on said bottom frame member adjacent said rear surface of said bottom frame member and above and rearwardly of said channel in said bottom frame member; top mounting means located below and rearwardly of said channel in said top frame member for securing said top frame member to the supporting structure, said top mounting means including a downwardly extending, top mounting flange on said top frame member adjacent said rear surface of said top frame member and below and rearwardly of said channel in said top frame member, said top mounting means further including a top mounting member engageable with the front surface of said top mounting flange and means for securing said top mounting member to the supporting structure; and vertical screws located rearwardly of said channels in said frame members and respectively extending through the ends of said top and bottom frame members and respectively threaded into the ends of said side frame members to secure said side frame members directly to said bottom and top frame members, said screws being located laterally inwardly of the laterally outermost parts of said channels in said side frame members.

7. In combination: a rectangular frame provided with mitered corners and including bottom, top and side frame members respectively having front and rear surfaces and respectively provided adjacent said front surfaces thereof with channels which face inwardly of said frame and which are respectively adapted to receive therein the edges of a rectangular mirror, or the like; bottom mounting means located above and rearwardly of said channel in said bottom frame member for securing said bottom frame member to a supporting structure, said bottom mounting means including an upwardly extending, bottom mounting flange on said bottom frame member adjacent said rear surface of said bottom frame member and above and rearwardly of said channel in said bottom frame member; top mounting means located below and rearwardly of said channel in said top frame member for securing said top frame member to the supporting structure, said top mounting means including a downwardly extending, top mounting flange on said top frame member adjacent said rear surface of said top frame member and below and rearwardly of said channel in said top frame member, said top mounting means further including a top mounting member engageable with the front surface of said top mounting flange and means for securing said top mounting member to the supporting structure; and vertical screws located rearwardly of said channels in said frame members and respectively extending through the ends of said top and bottom frame members and respectively threaded into the ends of said side frame members to secure said side frame members directly to said bottom and top frame members, said side frame members respectively being provided therein with vertical screw troughs into the end of which said screws are respectively threaded, said screw troughs being located laterally inwardly of the laterally outermost parts of said channels in said side frame members.

References Cited in the file of this patent

UNITED STATES PATENTS

| | | |
|---|---|---|
| 1,883,834 | Turner | Oct. 18, 1932 |
| 2,075,588 | Meyers | Mar. 30, 1937 |
| 2,114,617 | Verhagen | Apr. 19, 1938 |